United States Patent [19]
Shimada

[11] Patent Number: 5,172,943
[45] Date of Patent: Dec. 22, 1992

[54] PIPE JOINT AND ITS PIPE SLIPOUT PREVENTIVE MECHANISM

[75] Inventor: Haruki Shimada, Nara, Japan

[73] Assignee: Nitta-Moore Co., Ltd., Osaka, Japan

[21] Appl. No.: 634,076

[22] Filed: Dec. 26, 1990

[30] Foreign Application Priority Data

Jun. 7, 1990 [JP] Japan .................................. 2-150240
Jun. 7, 1990 [JP] Japan .................................. 2-150241

[51] Int. Cl.⁵ .............................................. F16L 33/00
[52] U.S. Cl. .................................... 285/323; 285/243;
285/83; 285/86; 285/102
[58] Field of Search .................. 285/323, 322, 243, 86,
285/249, 101, 104, 102, 306, 83

[56] References Cited

U.S. PATENT DOCUMENTS

| | | | |
|---|---|---|---|
| Re. 22,810 | 8/1943 | Miller | 285/322 |
| 960,890 | 6/1910 | Garret | 285/322 X |
| 4,229,025 | 10/1980 | Volgstadt | 285/323 X |
| 4,984,826 | 1/1991 | Yokomatsu et al. | 285/323 X |

*Primary Examiner*—Randolph A. Reese
*Assistant Examiner*—Timothy Aberle
*Attorney, Agent, or Firm*—Koda and Androlia

[57] ABSTRACT

A pipe joint for connecting pipes for passing a variety of fluid such as liquid or gas has been improved and has a pipe slipout preventive mechanism. In structure, the main body of the pipe joint is formed by coupling a nipple and a socket. An insert to be fitted externally by a pipe to be connected is installed slidably to the nipple. A collet for tightening the pipe is installed outside the insert with a proper spacing thereto. And the socket has a tapered part which is diminishing in diameter toward the pipe insertion port. A stopping member engages with and stops at the tapered part of the socket is provided outside of the insert.

3 Claims, 8 Drawing Sheets

PIPE JOINT AND ITS PIPE SLIPOUT PREVENTIVE MECHANISM

BACKGROUND OF THE INVENTION

1. Field of the Invention

The present invention relates to an improvement of a pipe joint for connecting pipes for passing a variety of fluid such as liquid or gas, and its pipe slipout preventive mechanism.

2. Prior Art

Hitherto, as shown in FIGS. 11 and 12, there has been known pipe joint structure in which, in a main body 1, an insert 4 moves back and forth in a specific range, and also in order to obtain a slipout preventive function, a rear end of the insert 4, or an opposite side of a pipe insertion port side, is to be abutted against a stepped part in a nipple 2, while a projection 10 formed at a rear part of the insert 4 is to be abutted against a protruding part 11 formed at an inner front end of the nipple 2.

In such a known joint, however, the protruding part 11 must be formed in the nipple 2 after fitting the insert 4 therein, so forming this protruding part 11 is rather difficult.

Moreover, as shown in the drawings, the known joint has a collet 5 in its main body 1 and the collet 5 tightens a pipe 6 connected to the insert 4 not to slip out when pulling force is applied to the pipe 6 in a slipout direction, or a direction toward the pipe insertion port.

However, if the collet 5 does not move certainly in the slipout direction, the tightening force of the collet 5 may fail and the connected pipe 6 may slip out.

SUMMARY OF THE INVENTION

The present invention is devised in the light of the foregoing background, and it is a primary object thereof to present a pipe joint capable of being easily fabricated without forming a protruding part 11 which is difficult in manufacture of pipe joints, and also comprising a slipout preventive mechanism of an insert in spite of such easily fabricated structure.

It is another object of the invention to provide a pipe slipout preventive mechanism of a pipe joint possessing a collect for tightening a pipe not to slip out, wherein, when the pipe is pulled in the slipout direction, the collet also moves certainly and slightly in the same direction, tightens the pipe not to slip out and maintains the connection securely.

In order to achieve these objects as well as the other objects clarified in the following detailed description and claims, the present invention features the following points.

According to claim 1 of the present invention, a pipe joint having a main body formed by coupling a nipple and a socket,
- an insert on which a pipe to be connected is fitted externally is slidably installed to an end of the nipple,
- a collet for tightening the pipe is installed around the insert with a proper spacing thereto,
- the socket is formed with a tapered part diminishing its diameter toward a pipe insertion port,
- a stopping member shaped to engage with and stop at the tapered part of the socket is disposed on an outside of the insert.

According to Claim 2 of the invention, in a similar structure to the invention of Claim 1, the outside diameter of the stopping member is smaller than that of the collet. On the other hand, according to Claim 3 of the invention, the outside diameter of the stopping member may be equal to or larger than that of the collet.

According to Claim 4 of the invention, the pipe slipout preventive mechanism of pipe joint has structure wherein a pipe joint comprises in its main body an insert to be fitted by the pipe on externally and a collet for tightening the pipe installed around the insert with a proper spacing thereto, and also on the outside of the insert a stopping member pressing the collet in the pipe slipout direction.

The pipe slipout preventive mechanism of pipe joint according to Claim 5 has similar structure to the invention of Claim 4, wherein the stopping member is formed separately from the collet. And in the structure of pipe slipout preventive mechanism according to Claim 6, the stopping member is formed into one body together with the collet.

Furthermore, in the structure of pipe slipout preventive mechanism according to Claim 7, the stopping member and the insert are formed into one body.

The pipe joint of the present invention comprising the means as stated above brings about the following function.

In the pipe joint according to the invention of Claim 1, even if the connected pipe is pulled in the slipout direction, the stopping member engages with and stops at the tapered part of the socket to be prevented from moving in the slipout direction, thereby the pipe joint obtaining a slipout preventive mechanism. Therefore no known difficult fabrication of the protruding part in the nipple is required in the present pipe joint.

In the pipe joint of Claim 4, since the stopping member for pressing the collet in the pipe slipout direction is disposed on the outside of the insert at about the middle of it, when the pipe slightly moves in the slipout direction, so does the insert responding to the movement of the pipe, and the movement of the insert is trasmitted to the collet through the stopping member. This causes the collet to move in the same direction as the pipe moves and apply tightening force to the pipe, so that the collet securely functions as a pipe slipout preventive mechanism.

Other advantages of the present invention will become more apparant in the following description referring to the accompanying drawings.

BRIEF DESCRIPTION OF THE DRAWINGS

FIG. 1 is a partial longitudinal sectional view of a pipe joint of the invention wherein an outside diameter of a stopping member is smaller than that of a collet, FIG. 2 is a partial longitudinal sectional view showing a state after connecting a pipe to the pipe joint in FIG. 1, FIG. 3 is a partial longitudinal sectional view of a pipe joint showing an embodiment of which stopping member has a larger outside diameter than a collet, and FIG. 4 is a partial longitudinal sectional view showing a state after connecting a pipe to the pipe joint in FIG. 3.

FIGS. 5 to 10 and FIG. 13 correspond to Claims 4 to 7 of the present invention, namely FIG. 5 is a partial longitudinal sectional view of a pipe joint having a pipe slipout preventive mechanism of the invention, FIG. 6 is a partial longitudinal sectional view showing a state where the collet of FIG. 5 is functioning, FIG. 7 is a partial longitudinal sectional view of a pipe joint showing an embodiment wherein an outside diameter of a stopping member is larger than that of a collet, FIG. 8 is a partial longitudinal sectional view showing a state where the collet of FIG. 7 is functioning, FIG. 9 is a partial longitudinal sectional view of a pipe joint of which stopping member is formed into only body together with a collet, and FIG. 10 is a partial longitudinal sectional view showing a state where the collet of FIG. 9 is functioning.

FIG. 13 is a perspective view of a collet.

DETAILED DESCRIPTION OF THE INVENTION

Figure 1:
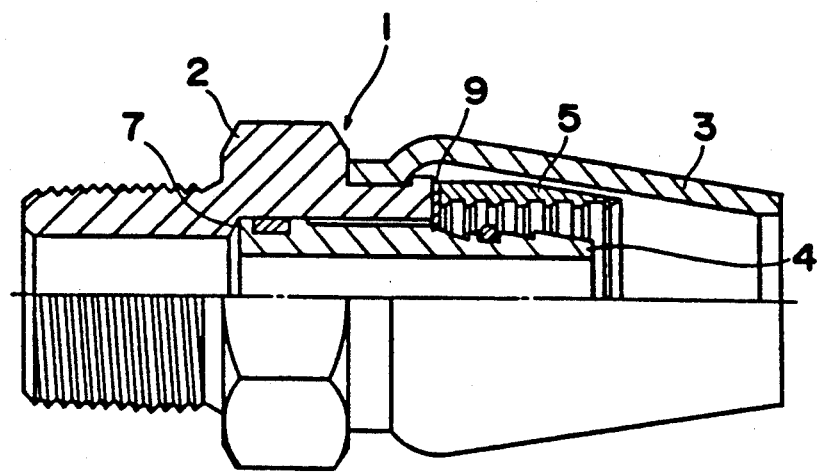
FIGS. 1 to 4 and FIG. 13 correspond to Claims 1 to 3 of the present invention, namely

Referring now to the drawings, some embodiments of the present invention are described in detail below.

First of all, referring to FIGS. 1 to 4 and FIG. 13, the constitution of Claims 1 to 3 of the invention is described.

This pipe joint comprises a main body 1 formed by coupling a nipple 2 and a socket 3, and an insert 4 is slidably fitted to the inside of the nipple 2, and a collet 5 is installed outside the insert 4 with a proper spacing thereto.

Connection is conducted when the insert 4 is inserted into an end of a pipe 6 to be connected, and the rear end of the insert, or the other end of the side connecting to the pipe 6, abuts against a stepped part 7 of the nipple 2, which prevents the insert 4 from going further beyond a certain extent.

When the pipe 6 is fitted on the insert 4, the collet 5 is located outside the pipe 6.

Figure 13:
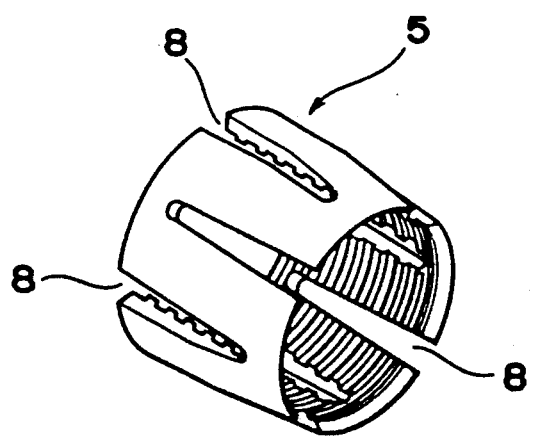

The collet 5 has cut-off grooves 8, some of which are open to one end and the other to the other end alternately in the longitudinal direction as shown in FIG. 13, thereby being elastic inwardly and outwardly in the radial direction. The pipe is connected and pulled in the slipout direction, the collect also moves slightly in the slipout direction together with the insert 4. At this time, since the inner surface of the socket 3 has a tapered part diminishing its diameter toward the pipe insertion port, the collet 5 engaged with the part and gets smaller in diameter to tighten the pipe 6, thereby preventing the pipe 6 from slipping out.

Numeral 9 is a stopping member, which is in a shape to engage with and stop at the tapered part of the socket 3 and projecting outside of the insert 4.

Therefore, the stopping member 9 blocks the movement of the insert 4 toward the pipe insertion port, thereby, while the pipe 6 is not connected, functioning to prevent the insert 4 from slipping out.

When the insert 4 moves slightly in the slipout direction, the stopping member 9 also moves together with it. Furthermore, the stopping member 9 is fitted to the inner end (opposite to the insertion port) of the collet 5, so when the pipe 6 moves in the slipout direction, all of the insert 4, the stopping member 9 and the collet 5 start moving in the same direction together with the pipe 6.

Moving slightly, the collet 5 begins to get smaller in diameter, as being affected by the tapered part of the socket 3. With the collet 5 becoming smaller in diameter, the pipe 6 is tightened by the collet 5 and blocked to move further than a certain extent in the slipout direction, thereby being prevented from slipping out.

At the same time, the stopping member 9 is stopped at the tapered part of the socket 3, and no longer moves toward the pipe insertion port beyond a certain extent.

Figure 3:
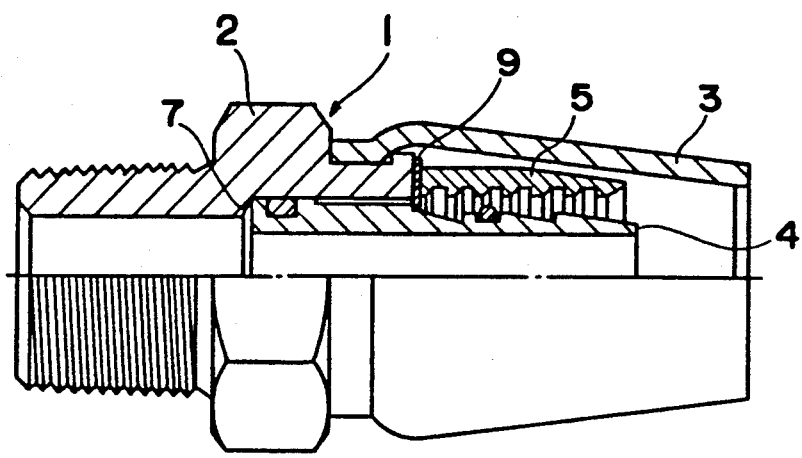
Figure 4:
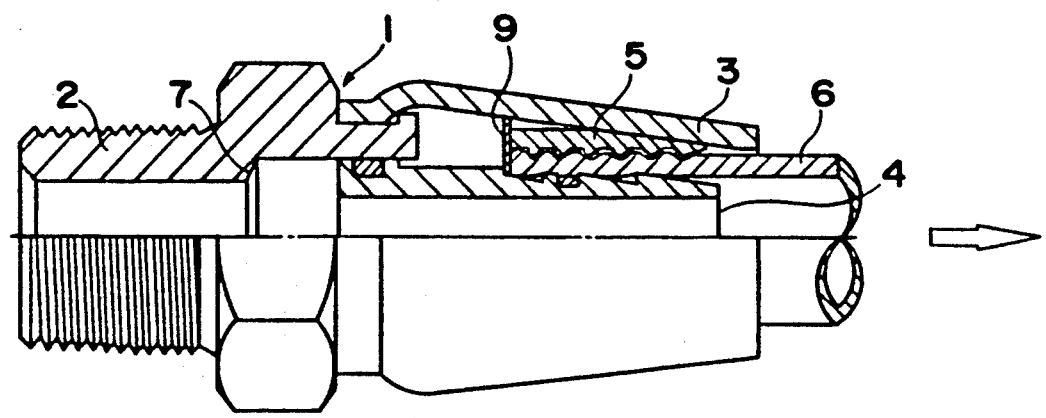
Figure 5:
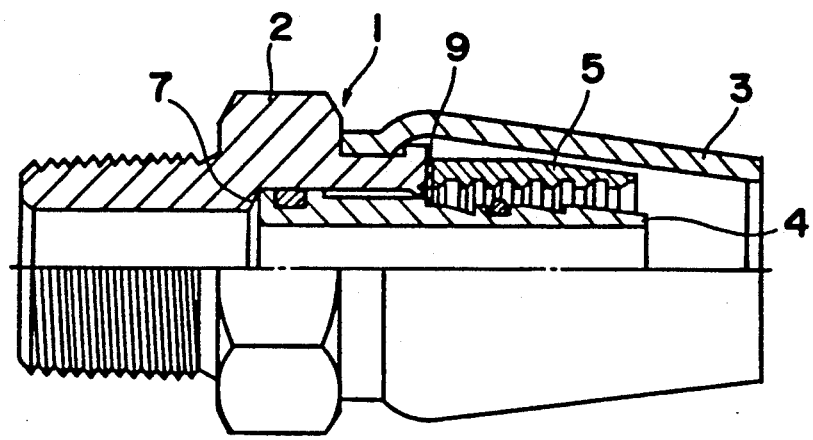
Figure 6:
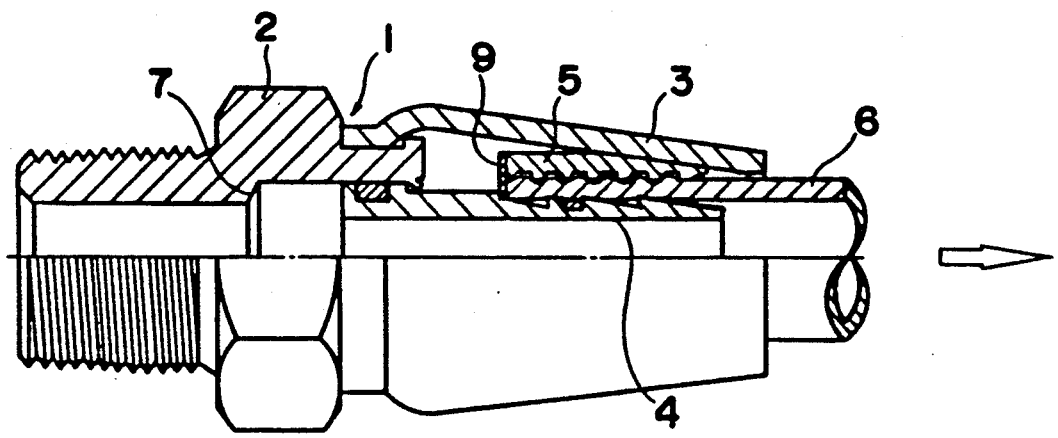

The outer diameter of the stopping member 9 may be set either, as shown in FIG. 1, smaller than that of the collet 5, or as shown in FIGS. 3 and 4, larger than that of the collet 5. It may, of course, be equal to that of the collet.

Figure 2:
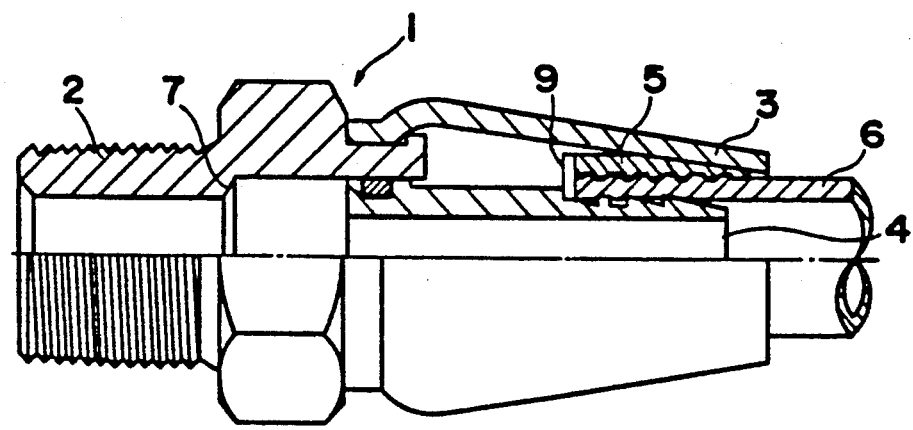

In case of the stopping member 9 with smaller outer diameter than that of the collet 5, when the pipe 6 connected with the insert 4 moves in the slipout direction, the pipe 6, the insert 4, the collet and the stopping member 9 move in the slipout direction and the outside diameter of the collet 5 has got smaller than that of the stopping member 9, as shown in FIG. 2, the stopping member 9 engages with and stops at the tapered part of the socket 3, thereby functioning as a pipe slipout preventive mechanism.

Also in case of the stopping member 9 of which outer diameter is equal to and larger than the outer diameter of the collet 5, when the insert 4 and the others move in the slipout direction, as shown in FIG. 4, the stopping member 9 engages with and stops at the tapered part of the socket 3, thereby functioning to prevent the pipe from slipping out.

Next, referring to FIGS. 5 to 10 and FIG. 13, the constitution of claims 4 to 7 of the invention is described below.

This pipe joint comprises a main body 1 formed by coupling a nipple 2 and a socket 3, and an insert 4 is fitted to the inside of the nipple 2, and a collet 5 is installed outside the insert 4 with a proper spacing thereto.

Connection is conducted when the insert 4 is inserted into an end of a pipe 6 to be connected, and the rear end of the insert, or the other end of the side connecting to the pipe 6, abuts against a stepped part 7 of the nipple 2, which prevents the insert 4 from going further than a certain extent.

When the pipe 6 is fitted on the insert 4, the collet 5 is located outside the pipe 6.

The collet 5 has cut-off grooves 8, some of which are open to one end and the other to the other end alternately in the longitudinal direction as shown in FIG. 13, thereby being elastic inwardly and outwardly in the radial direction. The pipe is connected and pulled in the slipout direction, the collect also moves slightly in the slipout direction together with the insert 4. At this time, since the inner surface of the socket 3 has a tapered part diminshing its diameter toward the pipe insertion port, the collet 5 engaged with the part and gets smaller in diameter to tighten the pipe 6, thereby preventing the pipe 6 from slipping out.

However, when a contact state of the collet 5 and the pipe 6 is loose, the collet 5 may not move in the slipout direction together with the pipe 6 and the tightening force of the collet 5 may not take effect.

Accordingly, a stopping member 9 for pressing the collet 5 in the pipe slipout direction is provided outside of the insert 4 at about the middle of it.

The stopping member 9 is projecting outside the insert 4, and is designed to move together with the insert 4 when the insert 4 moves in the slipout direction. In addition, this stopping member 9 is designed to abut against the inner end of the collet 5, so when the pipe 6 moves in the slipout direction, all of them, i.e. the insert 4, the stopping member 9 and the collet 5, start moving in the same direction together with the pipe 6.

Moving slightly, the collet 5 begins to get smaller in diameter as being affected by the tapered part of the socket 3. With the collet 5 becoming smaller in diameter, the pipe 6 is tightened by the collet 5 and blocked to move further than a certain extent in the slipout direction, thereby being prevented from slipping out.

Figure 7:
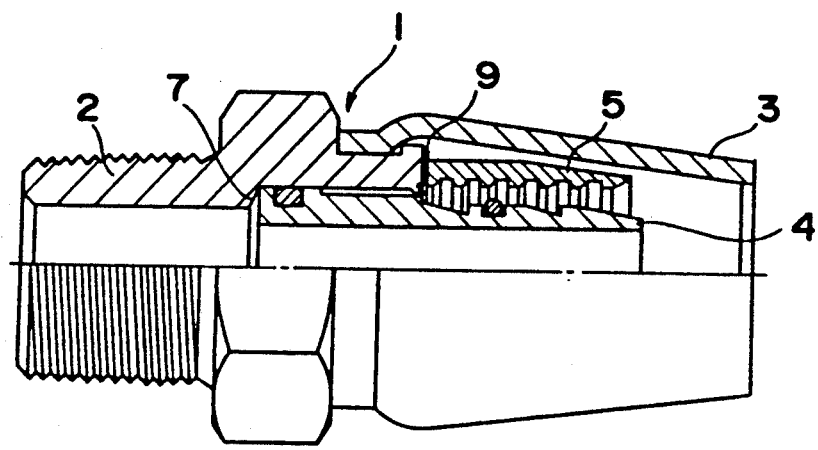
Figure 8:
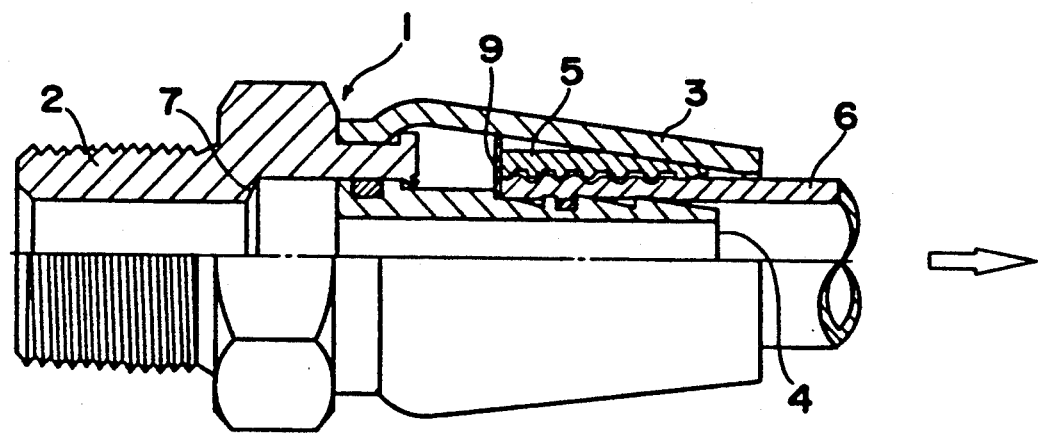

FIGS. 5 to 8 show an embodiment in which the stopping member 9 is separately formed from the collet 5, and more specifically in FIGS. 7 and 8, the outside diameter of the stopping member 9 is larger than that of the collet 5, and it is designed that the pipe does not move in the slipout direction more than necessary by means of engagement of the stopping member 9 and the inner surface of the socket 3.

Figure 9:
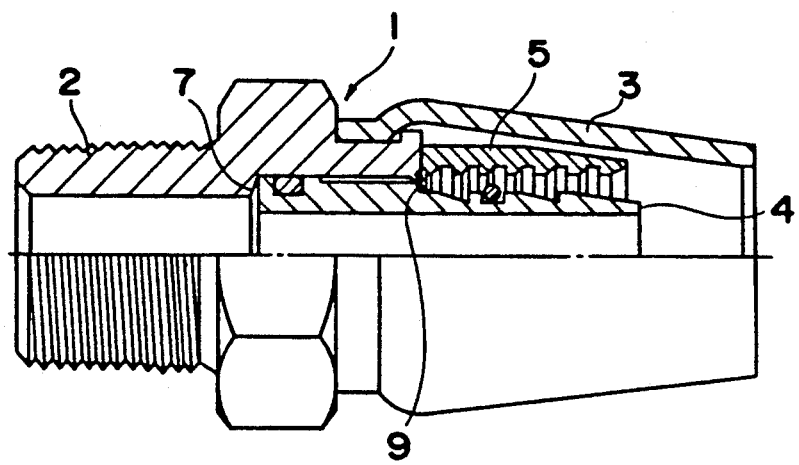
Figure 10:
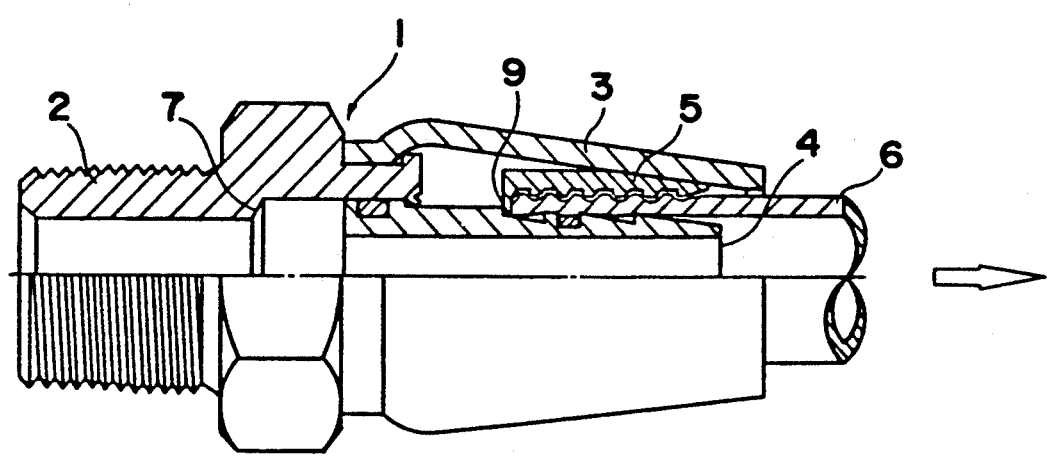
Figure 11:
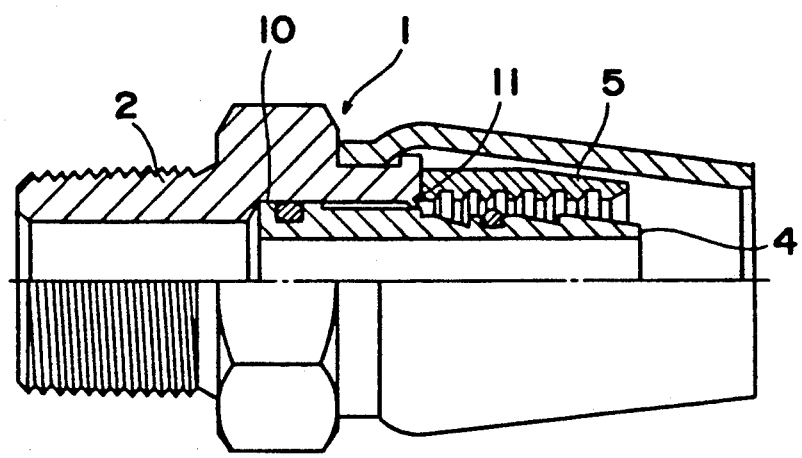
FIG. 11 is a partial longitudinal sectional view of a conventional pipe joint.
Figure 12:
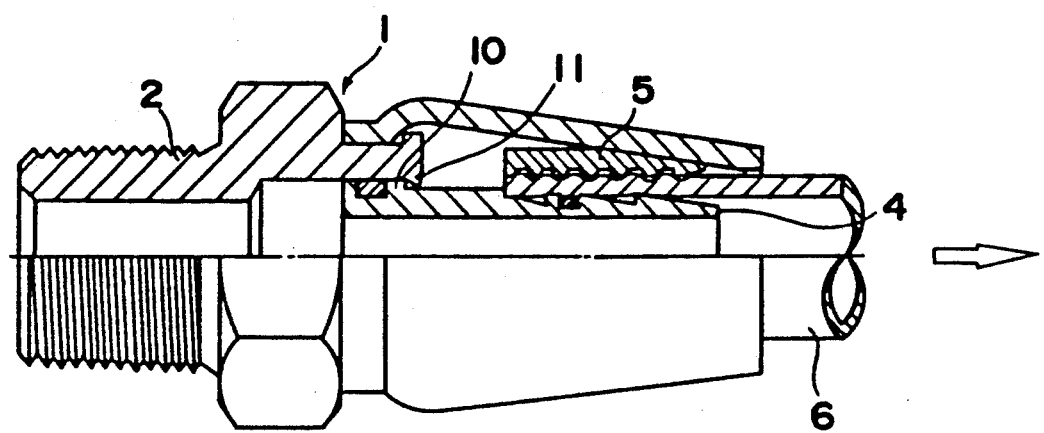
FIG. 12 is a partial longitudinal sectional view showing a state after connecting a pipe to the conventional pipe joint.

FIGS. 9 and 10 relate to an embodiment in which the stopping member 9 and the collet 5 are formed into one body, and in this structure the collet 5 has a flange at its inner end part as a stopping member 9, the flange being formed in the radially inward direction, and the stopping member 9 is engaged with the insert 4.

Another embodiment may be realized by forming the stopping member 9 and the insert 4 into one body.

Figure 14:
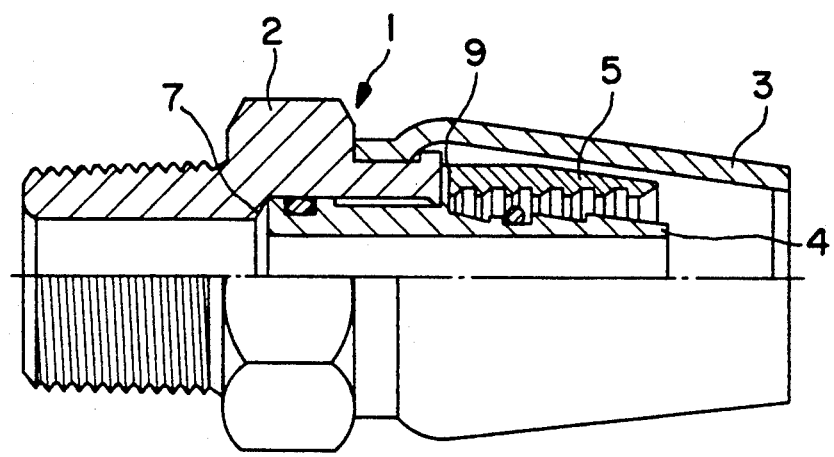
FIGS. 14 and 15 are partial longitudinal section of illustrating another embodiment of the present invention.
Figure 15:
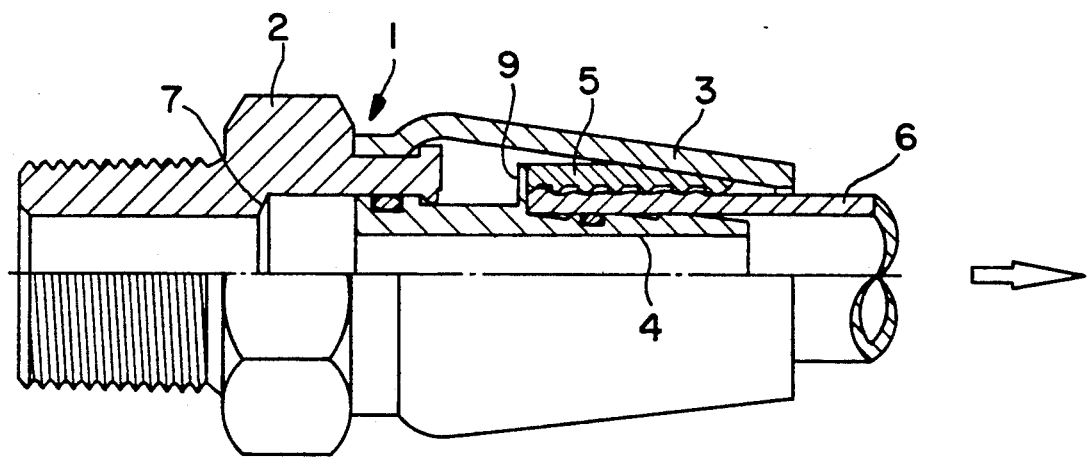

In this case, the stopping member 9 is extended and projected on the outside of the insert 4 as shown in FIGS. 14 and 15.

The invention of claim 1 comprises the above-mentioned structure, and the pipe slipout preventive mechanism may be obtained by the simple structure having a stopping member or simple job providing it, and does not require a conventional forming step of the protruding part 11 within the nipple 2 which is a troublesome work in fabricating a conventional pipe joint. Thus, according to the present invention, the pipe joint having the slipout preventive mechanism of the insert 4 may be fabricated easily.

The invention of claim 4 comprises the structure as described above, and therefore when the force in the slipout direction is applied to the pipe 6, the movement of the pipe 6 in the slipout direction causes the collet 5 to move securely together with the stopping member 9 and the insert 4. Accordingly, the pipe slipout preventive mechanism of this pipe joint acts certainly on the collet 5, so that a secure slipout prevention is guaranteed.

These embodiments of the present invention described herein are preferred forms, and various changes and modifications in shape and size of parts may be possible without departing from the true spirit and the scope of the claims of the invention.

What is claimed is:

1. A pipe joint having a main body formed by coupling a nipple and a socket comprising:
   an insert on which a pipe to be connected is fitted externally being slidably installed to the nipple,
   a collet for tightening the pipe being installed outside the insert with a spacing thereto,
   the socket having a tapered part diminishing in diameter toward a pipe insertion port, and
   a stopping member having a larger outer diameter than the smallest inner diameter of the tapered part of the socket and being provided on the outer surface of the insert, wherein when the insert moves in a slipout direction, the stopping member engages with and stops at the tapered part of the socket.

2. A pipe joint according to claim 1, wherein an outside diameter of the stopping member is smaller than that of the collet.

3. A pipe joint according to claim 1, wherein an outside diameter of the stopping member is equal to or larger than that of the collet.

* * * * *